US008055583B2

(12) United States Patent
Dueck et al.

(10) Patent No.: US 8,055,583 B2
(45) Date of Patent: Nov. 8, 2011

(54) SHARED ONLINE AUCTION PROVISIONING

(75) Inventors: Gunter Dueck, Neckargemuend (DE);
Oliver Mark, Ludwigshafen (DE);
Stefan Pappe, Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/690,285

(22) Filed: Mar. 23, 2007

(65) Prior Publication Data
US 2008/0235126 A1  Sep. 25, 2008

(51) Int. Cl.
*G06Q 40/00* (2006.01)
(52) U.S. Cl. ............. 705/40; 705/37; 273/274; 273/292
(58) Field of Classification Search .................... 705/37
See application file for complete search history.

(56) References Cited

U.S. PATENT DOCUMENTS

| 5,835,896 | A * | 11/1998 | Fisher et al. ............... 705/37 |
| 6,260,027 | B1 * | 7/2001 | Takahashi et al. ........... 705/69 |
| 6,629,082 | B1 * | 9/2003 | Hambrecht et al. ....... 705/36 R |
| 6,938,900 | B2 * | 9/2005 | Snow ........................ 273/292 |
| 7,085,740 | B1 * | 8/2006 | Meyers ...................... 705/37 |
| 7,177,832 | B1 * | 2/2007 | Semret et al. ............... 705/37 |
| 7,197,476 | B2 * | 3/2007 | Le et al. ..................... 705/26 |
| 2001/0054021 | A1 * | 12/2001 | Kawakura et al. .......... 705/37 |
| 2002/0072940 | A1 * | 6/2002 | Keough ......................... 705/5 |
| 2002/0107773 | A1 * | 8/2002 | Abdou ......................... 705/37 |
| 2003/0093355 | A1 * | 5/2003 | Issa ............................ 705/37 |
| 2003/0216959 | A1 | 11/2003 | Vitti |
| 2005/0080712 | A1 * | 4/2005 | Bauer et al. ................. 705/37 |
| 2005/0119966 | A1 * | 6/2005 | Sandholm et al. ........... 705/37 |
| 2005/0203827 | A1 * | 9/2005 | Gamble ....................... 705/37 |
| 2005/0216391 | A1 | 9/2005 | Tews |
| 2005/0283420 | A1 * | 12/2005 | Bailey et al. ................ 705/37 |
| 2006/0224497 | A1 * | 10/2006 | Walker et al. ............... 705/37 |
| 2006/0242056 | A1 * | 10/2006 | Walker et al. ............... 705/37 |
| 2008/0114671 | A1 * | 5/2008 | Goel et al. .................. 705/37 |

FOREIGN PATENT DOCUMENTS
WO     0122326 A1     3/2001

OTHER PUBLICATIONS myfantasyleague.com by Bonscott posted May 11, 2005—p. 1 @ forums.myfantasyleague.com/forums/index.php?showtopic=7486&hl=.*

(Continued)

*Primary Examiner* — Shahid Merchant
*Assistant Examiner* — Mary Gregg
(74) *Attorney, Agent, or Firm* — William Schiesser; Hoffman Warnick LLC

(57) ABSTRACT

A solution for conducting an auction, such as an online auction, is provided, which includes provisions for sharing with bidders a portion of a bid. A method for conducting the auction includes identifying an item for auction; receiving a first bid for the item placed at a first time; receiving a second bid for the item placed at a second time, wherein the second bid exceeds the first bid by a bid increment and the second time is different than the first time by a time increment; and assigning a portion of the second bid for distribution to at least one participant of the auction. In various embodiments, the portion may be assigned to all bidders, the winning bidders, only the non-winning bidders, and/or the like. The distribution of the portion may be time and/or bid amount related.

27 Claims, 5 Drawing Sheets

OTHER PUBLICATIONS

Mehta et al, "An Empirical Evidence of Winner's Curse in Electronic Auctions", International Conference on Information Systems, Association for Information Systems 1999, pp. 465-471.

Holland et al, "Robust Solutions for Combinatorial Auctions", Electronic Commerce, ACM Press 2005, pp. 183-192.

Segev et al, "Brokering Strategies in Electronic Commerce Markets", E-Commerce, ACM Press 1999, pp. 167-176.

* cited by examiner

SHARED ONLINE AUCTION PROVISIONING

FIELD OF THE INVENTION

The invention relates generally to auctions such as online auctions, and more particularly, to an improved auction system that includes provisions for sharing the auction receipts.

BACKGROUND OF THE INVENTION

Auctions, particularly online auctions, have developed recently and are widespread and increasingly popular (e.g., over the Internet). These auctions typically include at a minimum a seller, or sellers, offering up for sale at the auction one, or more, goods and services. The auction is conducted, over sought, and/or managed by an auctioneer wherein the auction, if successful, includes at least one bidder who ultimately ends up the buyer of the offered-for-sale goods and/or services. Post-auction activities typically may include the exchange of money (in the successful bid amount) for the shipment of the purchased goods and/or services.

Online auctions have drawbacks that are similar to traditional in-person auctions. Amongst them may include "winner's curse" which essentially states that the winner at the auction (i.e., winning bidder) often overbids (i.e., pays a higher price than the rational value of the item). Also, there is the occurrence where the winning bidder has placed a winning bid for a good that is below, or far below, the fair market price, or rational value, for the particular good. Indeed, under the "classical" auctioning method, this is often the ultimate goal of the bidders. That is auction participants often do not necessarily wish to purchase desired goods and services, but are ultimately just looking for a "great deal." Various theories abound as to what aspects may attribute to this. In fact, online auctions have attributes which may exacerbate these shortcomings as compared to in-person auctions. Due to the relative technical ease of, for example, searching online auctions, bidding quickly at online auctions, and bidding immediately prior to the close of the online auctions, there are a host of bidders that search, bid, and obtain goods for an irrationally low bid price. This often occurs when there is a single bidder at the auction. For example, due to a lack of bidding activity from any other bidders, the bidder may get lucky and purchase a good for $1 at the auction (when the rational value of the good may, in fact, be $100). Applying a participant-centric paradigm to an online auction reveals that all bidders (assuming rational behavior) want to obtain the offered item at the lowest possible bid. Contrastingly, the seller typically wants to sell the item at the highest possible bid. The auctioneer wants to sell the item as quickly as possible and at as high a possible bid; and, continue selling more items at the instant auction and at future auctions. Overlaid on this dynamic is the tension between what an "equilibrium", "fair", "true", and/or "rational" price for a good or service is and an "irrational" or "undervalued" price for the same good or service. Due to these inherently conflicting positions and viewpoints from the various participants (i.e., bidder, seller, buyer, auctioneer), current auction scenarios (e.g., online and/or in-person auctions) invariably result in one, or more, participants being unsatisfied.

In view of the foregoing, a need exists to overcome one or more of the deficiencies in the related art.

SUMMARY OF THE INVENTION

The invention provides a solution for conducting an auction, such as an online auction, which includes provisions for sharing with bidders a portion of a bid. A method for conducting the auction includes identifying an item for auction; receiving a first bid for the item placed at a first time; receiving a second bid for the item placed at a second time, wherein the second bid exceeds the first bid by a bid increment and the second time is different than the first time by a time increment; and assigning a portion of the second bid for distribution to at least one participant of the auction. In various embodiments, the portion may be assigned to all bidders, the winning bidders, only the non-winning bidders, and/or the like. The distribution of the portion may be time and/or bid amount related.

A first aspect of the invention provides a method for conducting an auction, the method comprising: identifying an item for auction; receiving a first bid for the item placed at a first time; receiving a second bid for the item placed at a second time, wherein the second bid exceeds the first bid by a bid increment and the second time is different than the first time by a time increment; and assigning a portion of the second bid for distribution to at least one participant of the auction.

A second aspect of the invention provides a system for conducting an auction, the system comprising: a system for identifying an item for auction; a system for receiving a first bid for the item placed at a first time; a system for receiving a second bid for the item placed at a second time, wherein the second bid exceeds the first bid by a bid increment and the second time is different than the first time by a time increment; and a system for assigning a portion of the second bid for distribution to at least one participant of the auction.

A third aspect of the invention provides a computer program stored on a computer-readable medium, which when executed, enables a computer system to conduct an auction, the computer program comprising program code for enabling the computer system to: identify an item for auction; receive a first bid for the item placed at a first time; receive a second bid for the item placed at a second time, wherein the second bid exceeds the first bid by a bid increment and the second time is different than the first time by a time increment; and assign a portion of the second bid for distribution to at least one participant of the auction.

A fourth aspect of the invention provides a method for deploying an application for conducting an auction, comprising: providing a computer infrastructure being operable to: identify an item for auction; receive a first bid for the item placed at a first time; receive a second bid for the item placed at a second time, wherein the second bid exceeds the first bid by a bid increment and the second time is different than the first time by a time increment; and assign a portion of the second bid for distribution to at least one participant of the auction.

A fifth aspect of the invention provides computer software embodied in a propagated signal for conducting an auction, the computer software comprising instructions to cause a computer system to perform the following functions: identifying an item for auction; receiving a first bid for the item placed at a first time; receiving a second bid for the item placed at a second time, wherein the second bid exceeds the first bid by a bid increment and the second time is different than the first time by a time increment; and assigning a portion of the second bid for distribution to at least one participant of the auction.

A sixth aspect of the invention provides a business method for conducting an auction, the business method comprising managing a computer system that performs the process described herein; and receiving payment based on the managing.

The illustrative aspects of the present invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for conducting an auction such as an online auction, which includes provisions for sharing with bidders a portion of a bid. A method for conducting the auction includes identifying an item for auction; receiving a first bid for the item placed at a first time; receiving a second bid for the item placed at a second time, wherein the second bid exceeds the first bid by a bid increment and the second time is different than the first time by a time increment; and assigning a portion of the second bid for distribution to at least one participant of the auction. In various embodiments, the portion may be assigned to all bidders, the winning bidders, only the non-winning bidders, and/or the like. The distribution of the portion may be time and/or bid amount related. A system for conducting an auction, a computer program stored on a computer-readable medium, a method for deploying an application for conducting an auction, a computer software embodied in a propagated signal for conducting an auction, and a business method for conducting an auction also are disclosed.

Figure 1:
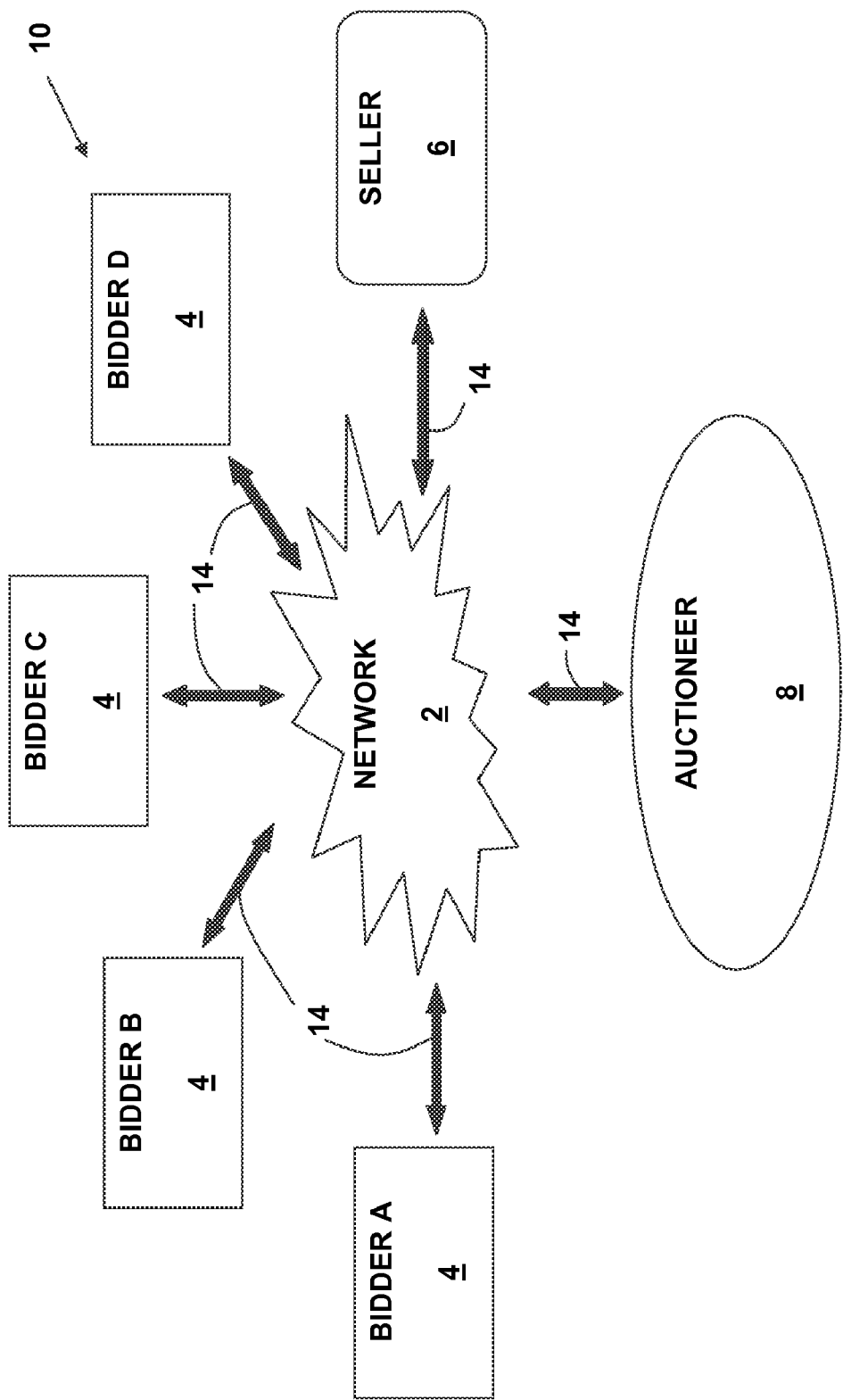
FIG. 1 shows an illustrative environment for an online auction according to an embodiment of the invention.
Figure 2:
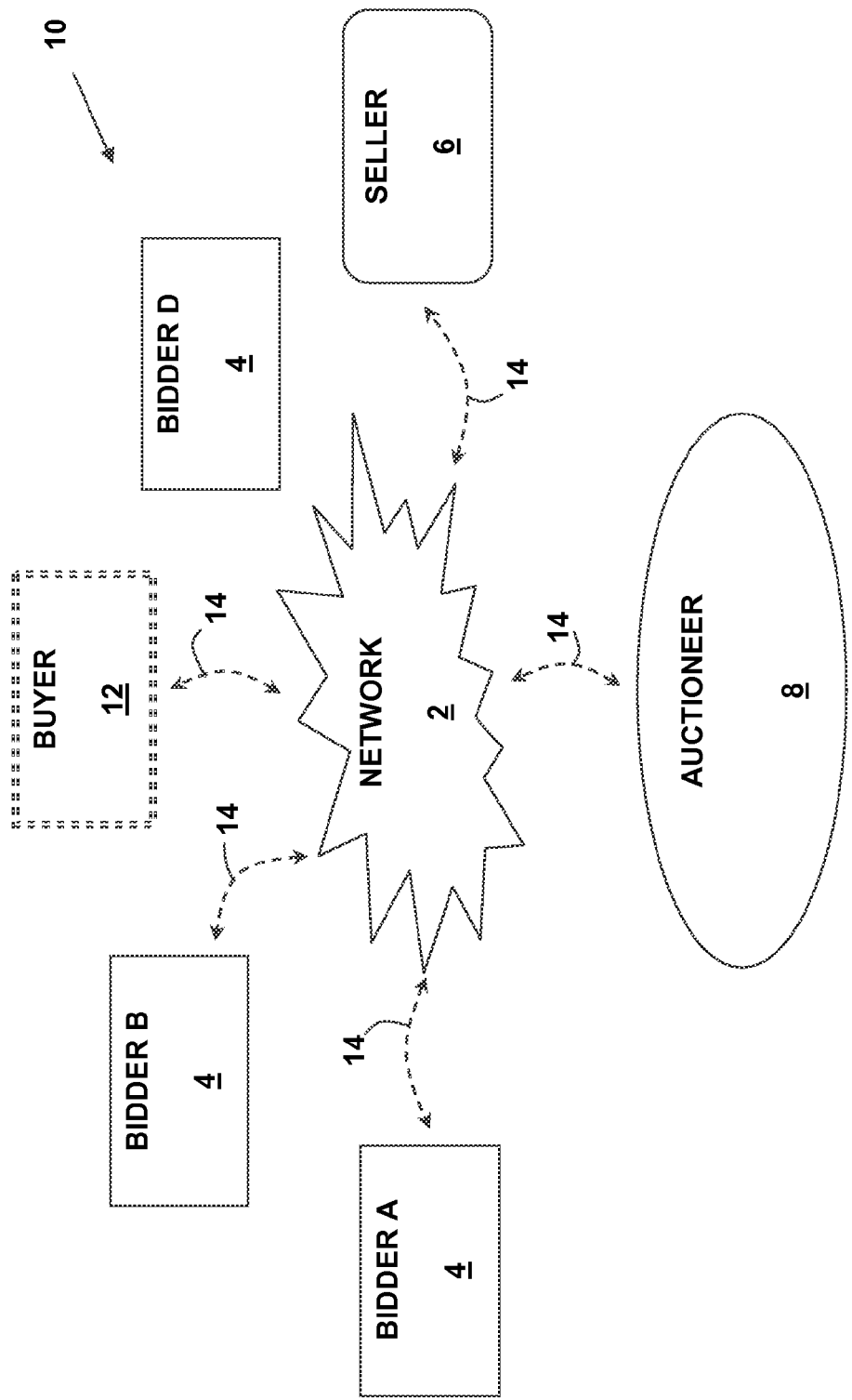
FIG. 2 shows the online auction of FIG. 1 upon the conclusion of a winning bid according to an embodiment of the invention.

Turning to the figures, FIG. 1 shows an illustrative online auctioning environment 10 (e.g., online auction) for conducting an online auction according to an embodiment of the invention, while FIG. 2 shows the same online auctioning environment upon the conclusion of a winning bid. To this extent, environment 10 includes at least one bidder 4, a seller 6, and an auctioneer 8, communicating via a network 2. An item is identified for the auction. The item may additionally be obtained and/or received. For example, the seller 6 may place a good and/or service (i.e., an item) up for auction. That is the seller 6 is offering the item for sale at the auction 10. The auctioneer 8 conducts the auction, which may include activities such as scheduling, advertising, managing, identifying, facilitating, communicating, sending, receiving, exchanging, and the like, some or all activities in the auction. Bidders 4 may comprise a single bidder 4, two bidders 4, or an all but infinite quantity of bidders 4. FIG. 1 shows, for illustrative purposes only, an auction 10 having four participants, or bidders 4 (i.e., Bidder A, Bidder B, Bidder C, Bidder D) in the embodiment discussed herein. While the network 2 typically would be the Internet, network 2 may be any electronic communication medium such as a virtual private network (VPN), wide area network (WAN), and/or the like.

Although a single auctioneer 8 and single seller 6 are discussed herein, clearly both or one of these elements may be a plurality. So too, may the item be any intangible or tangible goods/services that are offered for sale. For example, the item may be intellectual property or real property. So too, the term seller 6 merely connotes an entity, or entities, offering the item for bid at the auction 10, and is not meant to be limited to only an item placed at the auction 10 for a full irrevocable sale. The item may be offered for rent, lease, and the like, or any other exchange that is less than a full irrevocable sale.

In any event, the seller 6 in FIG. 1 places an item for bidding at the auction 10 so that the item is identifiable. As the various arrows indicate in FIG. 1, there is an exchange of information, and the like, between the various participants in the auction 10 via the network 2. For example, the seller 6 may send information related to the item for sale at the auction 10. The bidders 4 may submit bid(s) for the item for sale and/or submit requests for information from the seller 6 and/or the auctioneer 8. The auctioneer 8 may submit information and/or requests for information to the seller 6 and/or the bidders 4.

Figure 3:
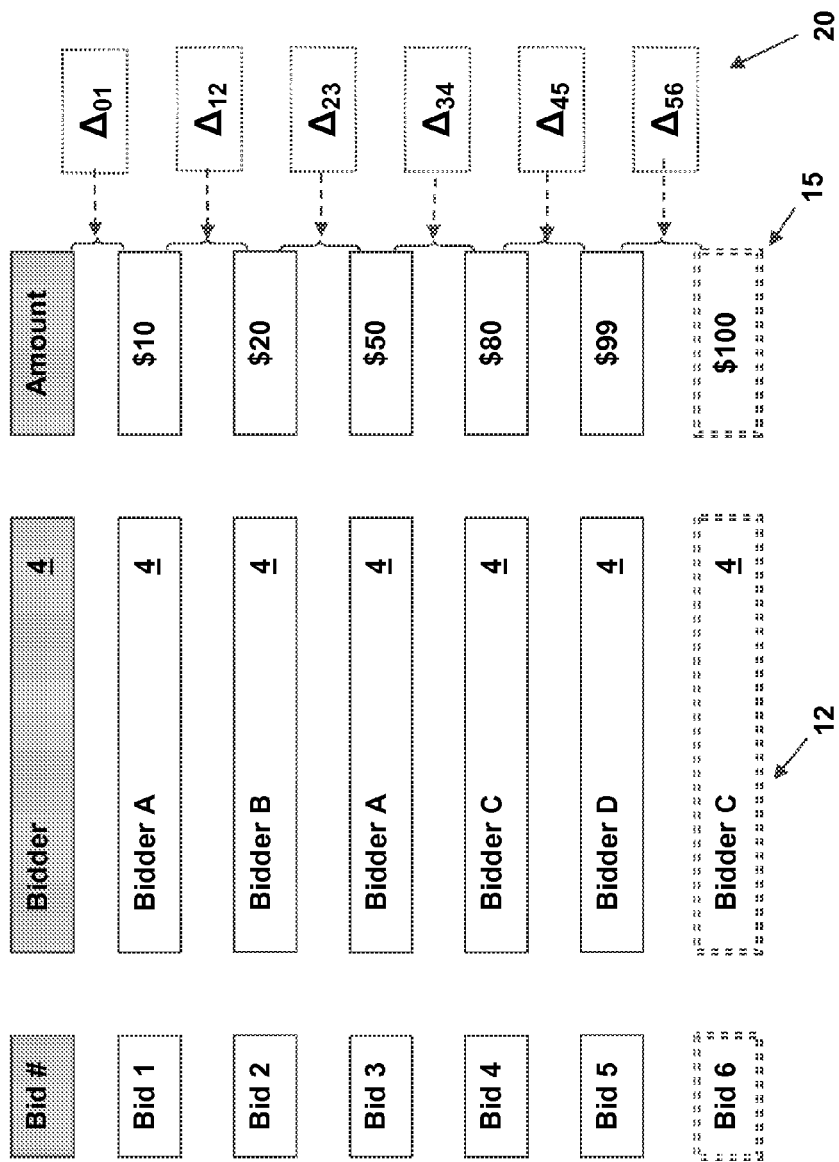
FIG. 3 shows a tabular compilation of bidding activity in an online auction according to an embodiment of the invention.

FIG. 3 depicts in tabular form a compilation of the ensuing bidding activity of an online auction 10 (FIG. 1) according to an embodiment of the invention. Thus, taken in view with FIG. 1, FIG. 3 shows that a first participant in the auction 10, in this embodiment Bidder A 4, placing a first bid for the item at a first time. The first bid is sometimes termed the opening bid. That is immediately once the auction 10 commences, or at some time duration thereafter, a first bid is received. As shown in the FIG. 3 depiction, the first bid (i.e., "Bid 1") from a bidder 4 (i.e., "Bidder A") is in the amount of $10.

Proceeding with the auction 10, a second participant, being Bidder B 4, places a second bid for the item at a second time, after the time at which the first bid was placed. For example, the second time is different than the first time (i.e., time of first bid) by a time increment. The second bid is higher than the first bid. As shown, the second bid by Bidder B 4 is in the amount of $20.

So, as shown, the auction 10 may continue wherein several additional bids are received for the item. Various aspects may cause the auction 10 to end by the auctioneer 8 including a time limit is exceeded, a predetermined bid amount (e.g., reserve) is reached, and/or other reasons. In any event, the sample auction 10 shown in FIG. 3 entails receiving additional bids. Bid 3 is by Bidder A 4 (again) in the amount of $50. Bid 4 is by Bidder C 4 in the amount of $80. Bid 5 is by Bidder D in the amount of $99. Bid 6 is by Bidder C 4 (again) in the amount of $100.

For one, or more, reasons the auction 10 is closed. That is, as FIGS. 2 and 3 show, the sixth bid (i.e., bid for $100 by Bidder C 4) is a winning bid 15, or sometimes termed the closing or final bid. Bidder C 4 is now also a buyer 12, or sometimes termed the "winner". As with the term "seller" discussed herein, the term "buyer" 12 is not meant to be limited to only a purchase of the irrevocably sale item at auction 10. For example, the buyer 12 may, in fact, now be agreeing to rent or lease the auctioned item. In any event, ultimately the seller 6, with possible facilitation by the auctioneer 8, will exchange, or award, the item to the buyer 12 in exchange for the buyer's 12 offering the successful winning bid 15 (i.e., Bid 6 for $100) at the auction 10. Payment for the item is made by the buyer 12 to the seller 6 in exchange for receipt of the item by the buyer 12. The auctioneer 8 may facilitate in the exchange.

So as to address at least one of the shortcomings of previous auctions, under aspects of the present invention, the auctioneer 8 will assign a portion of the winning bid 15 to at least one of the participants (e.g., bidders 4, etc.). The providing of sharing the portion of the winning bid 15 is typically conducted by the auctioneer 8. Various ways of sharing and/or distributing the portion are available, including assigning a portion of the winning bid 15 to all the participants (e.g., Bidder A, Bidder B, Bidder C, and Bidder D); assigning a portion of the winning bid 15 to only the non-winning participants (e.g., Bidder A, Bidder B, and Bidder D); and/or assigning a portion of the winning bid 15 to a third party entity other than an auction 10 participant (e.g., an entity related to the network 2, a selectable non-profit entity, and/or the like).

The portion that is assigned for distribution may be any amount that is a portion of the winning bid 15. However, the amount that is assigned for distribution typically may attempt to balance the needs, desires, and/or motivations of all auction 10 participants including bidders 4, buyer 12, seller 6, and/or auctioneer 8. The portion may be in a range of approximately 1% to approximately 15% of the winning bid 15. For example, if the winning bid 15 is $100 (see e.g., FIG. 3), and the portion of the winning bid 15 that is assigned for distribution is selected to be 10%, then the portion assigned for distribution will be $10 (i.e., 10% of $100).

The auctioneer 8 may inform auction 10 participants of the portion assigned for distribution before, during, and/or after the auction 10. Similarly, the portion assigned for distribution might be only determinable during, or after, the auction 10 based on several factors (e.g., bidding amounts, bidding frequency, winning bid amount, bid increment, types of bids, quantity of bids, types of bidders, quantity of bidders, etc.). For example, in one scenario, the portion assigned for distribution might be 10% of the winning bid 15 if, and only, more than five (5) distinct bidders 4 place bids. Similarly, the portion assigned for distribution may be fixed or variable. As another example, the portion assigned for distribution might be 10% of the winning bid 15 if, and only if, more than five (5) distinct bidders 4 place bids; and, yet, the portion assigned for distribution might be raised to 15% of the winning bid 15 if, and only if, more than ten (10) distinct bidders 4 place bids and the winning bid 15 exceeds a predetermined value. It should be apparent that there are available a nearly infinite quantity, variety, and/or permutations of assigning a portion of the bid for distribution. Similarly, the portion assigned for distribution may be based on activity from other auctions 10, in addition to the instant auction 10 at hand.

With each bid at the auction 10 there is a bid increment 20 (e.g., $\Delta_{XY}$) which is the amount the instant bid exceeds the previously placed bid, wherein "X" is the previous bid (or, in the event of the opening bid: "0") and "Y" is the instant bid. Thus, as FIG. 3 shows for the illustrative auction 10, bid increment $\Delta_{01}$ is $10 for the first bid (i.e., the difference between the bid amount of $10 and $0). Bid increment $\Delta_{12}$ is $10 for the second bid (i.e., by Bidder B 4) derived from the difference between $20 for the second bid and $10 for the previous (i.e., first) bid. Continuing with the remainder of the bids at auction 10, bid increments $\Delta_{23}$, $\Delta_{34}$, $\Delta_{45}$, $\Delta_{56}$, are $30, $30, $19 and $1, respectfully. Note too that the bid increment for the first bid (i.e., $\Delta_{01}$) may alternatively be the difference between the first bid and a value other than $0. For example, if a minimal starting bid is set by the auctioneer 8, then $\Delta_{01}$ would be the difference between the value of the first bid and the minimal starting bid.

Once the portion of the winning bid 15 is assigned for distribution to participants, the portion may be then distributed to the participants. There are various ways, under the present invention, to distribute the portion to the participants. The distribution may be based on a variety of factors including bid increment 20, time duration between bids, and the like. As with the amount of the portion for assignment (e.g., 1% to 15% of the winning bid 15), so too can the way the amount is distributed address at least some of the inherent shortcomings in auctioning as discussed herein.

Figure 4:
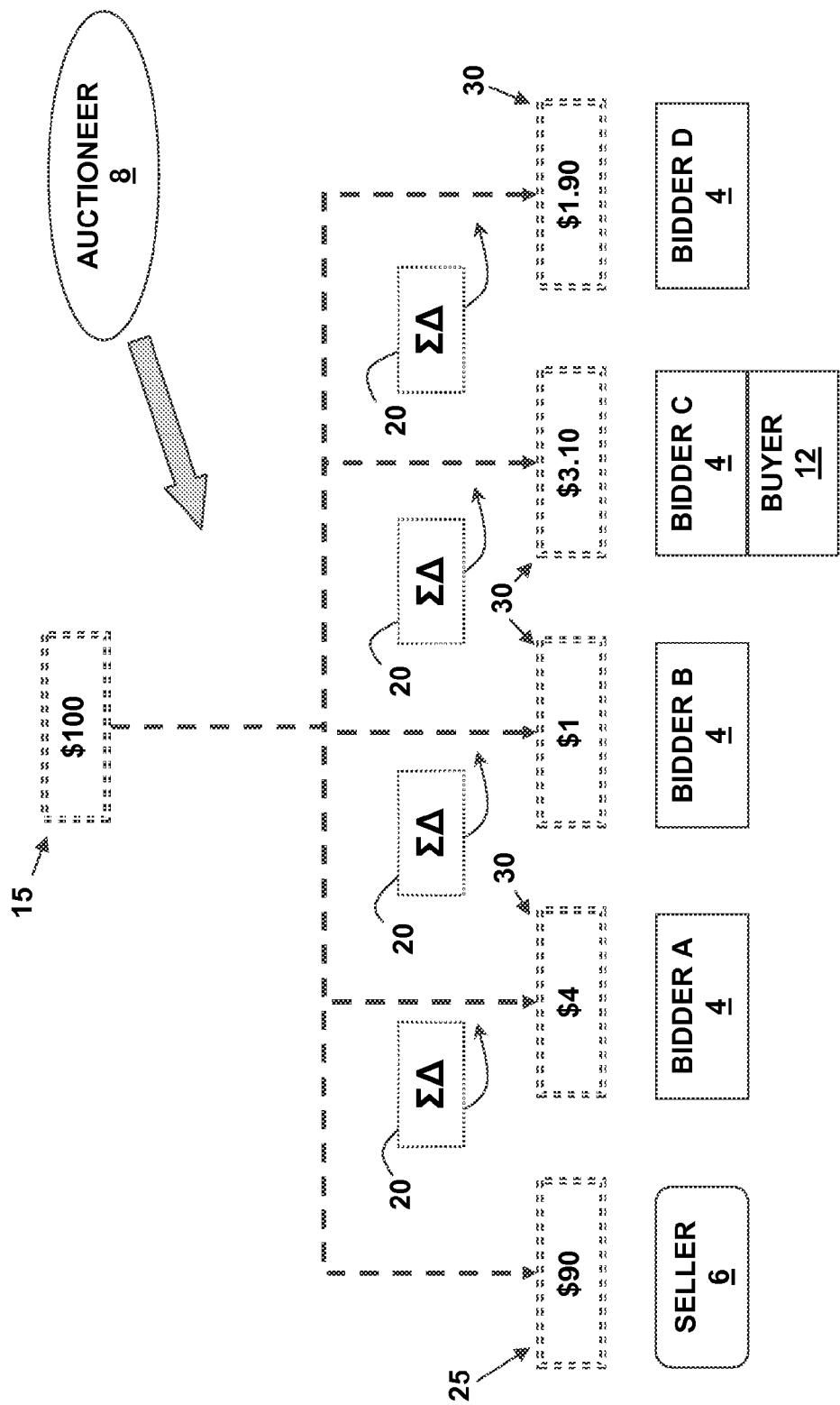
FIG. 4 shows shared online auction provisioning of the online auction of FIG. 3 according to an embodiment of the invention.

In one embodiment, the portion assigned for distribution is distributed based upon the bidder's 4 bid increment(s) 20. That is, as FIG. 4 depicts, each bidder 4 receives a sub-portion of the portion assigned for distribution based upon their respective bid increments 20 (see FIG. 3). If 10% is the amount used for assign a portion of the winning bid 15 to the participants and the wining bid 14 is $100, then the seller 6 receives $90 (i.e., $100−10%*$100). Thus, $10 is the amount assigned for distribution by the participants. Applying a bid increment-related distribution method to the $10, results in Bidder A 4 being rewarded $1 for placing the first bid of $10 (i.e., 10% of bid increment of $10) plus $3 for placing the third bid for $50 (i.e., 10% of bid increment $30) for a total of $4. Similarly, Bidder B 4 receives $1 for placing Bid 2 for $20 (i.e., 10% of bid increment $10); Bidder C 4 receives $3 for placing Bid 4 for $80 (i.e., 10% of bid increment $30) and $0.10 for placing Bid 6 (i.e., winning bid 15) for $100 (i.e., 10% of bid increment $1) for a total of $3.10; and, Bidder D 4 receives $1.90 for placing Bid 5 for $99 (i.e., 10% of bid increment $19). In this manner, all participants (Bidders A through D) receive a portion of the winning bid 15 as a reward for their participation in the auction 10.

Under an embodiment of the present invention, the auctioneer 8 may require that should a prospective bidder 4 in the auction 10 wish to participate in receiving a portion of the bid activity assigned for distribution, that the bidder 4 must be participate and/or communicate with the auctioneer 8 via a system for facilitating the distributing that employs an electronic payment system (e.g., PayPal®), a bank account, a credit card, and/or the like. In this manner, the online auction system may become an integrated auctioning and banking enterprise.

As FIGS. 1 and 2 also show, reference number 14 depicts the various exchanges between auction 10 participants including the exchange of information, request(s) for information, item(s), bid(s), payment(s), and/or the like between bidder(s) 4, buyer 12, seller 6, auctioneer 8, and/or third party (not shown). Ultimately, aspects of the present invention provide motivation for multiple bidders 4 to enter the auction 10. For while the possibility of a single bidder 4 obtaining the item for an irrationally low price is diminished, the probability of greater satisfaction in the auction 10 experience by all participants (i.e., auctioneer 8, seller, 6, and all bidders 4) is increased. Further, the item is more apt to be sold at its true, or equilibrium, price than in the classical auction setting.

Figure 5:
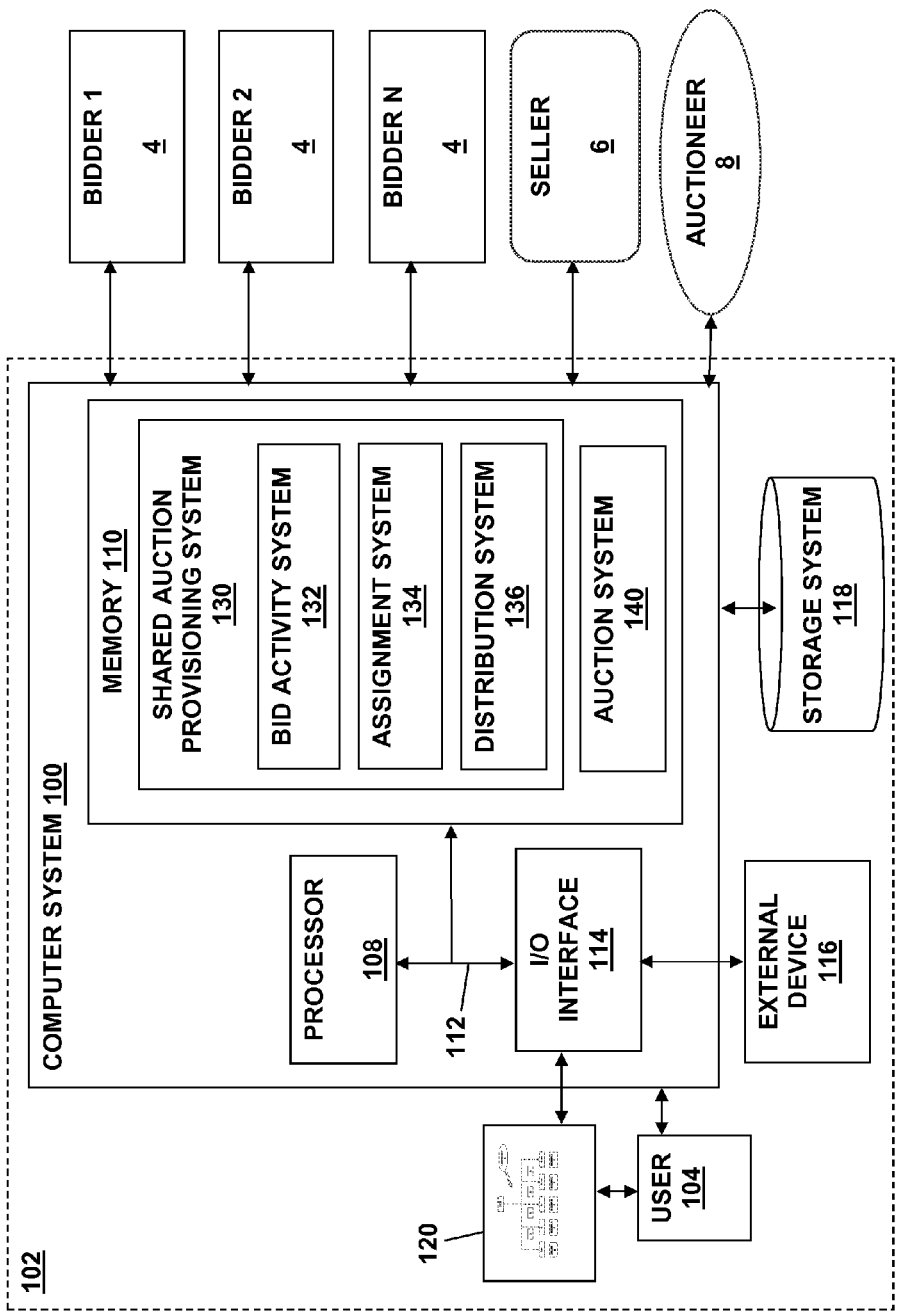
FIG. 5 shows an illustrative computer environment for shared online auction provisioning according to an embodiment of the invention.

Turning to FIG. 5, a computer system 100 is shown including a processor 108, a memory 110, an input/output (I/O) interface 114 in FIG. 5, and a bus 112. Further, computer system 100 is shown in communication with an external I/O device/resource 116 in FIG. 5 and a storage system 118. In general, processor 108 executes program code, such as shared auction provisioning system 130 and auction system 140, which is stored in a storage system, such as memory 110 and/or storage system 118. While executing program code, processor 108 can read and/or write data to/from memory 110, storage system 118, and/or I/O interface 114. Bus 112 provides a communications link between each of the components in computer system 100. I/O interface 114 can comprise any device that transfers information 120 between a user 104 and/or another computing device and computer system 100. To this extent, I/O interface 114 can comprise a user I/O device to enable user 104 to interact with computer system 100 and/or a communications device to enable external device 116 to communicate with computer system 100 using any type of communications link.

In any event, computer system 100 can comprise any general purpose computing article of manufacture capable of executing program code installed thereon. However, it is understood that computer system 100, shared auction provisioning system 130, and auction system 140 are only representative of various possible equivalent computing devices that may perform the process described herein. To this extent, in other embodiments, the functionality provided by computer system 100, shared auction provisioning system 130, and auction system 140 can be implemented by a computing article of manufacture that includes any combination of general and/or specific purpose hardware and/or program code. In each embodiment, the program code and hardware can be created using standard programming and engineering techniques, respectively.

Similarly, computer system 100 is only illustrative of various types of computer systems for implementing the invention. For example, in one embodiment, computer system 100 comprises two or more computing devices that communicate over any type of communications link to perform the process described herein. Further, while performing the process described herein, one or more computing devices in computer system 100 can communicate with one or more other computing devices external to computer system 100 using any type of communications link. In either case, the communications link can comprise any combination of various types of wired and/or wireless links; comprise any combination of one or more types of networks; and/or utilize any combination of various types of transmission techniques and protocols.

As discussed herein, shared auction provisioning system 130 and auction system 140 enable computer system 100 to conduct auctions, such as online auctions. To this extent, shared auction provisioning system 130 is shown including a bid activity system 132, an assignment system 134 and a distribution system 136. The bid activity system 132 may provide various functions including identifying items for auction, receiving bid(s) for the item, receiving aspects related to bid activity such as the bid increment and time increment of the bid(s), awarding the item to a participant, and/or the like. The assignment system 134 may assign a portion of a bid for distribution to participant(s), determine the size/amount/type of the portion, and/or the like. The distribution system 136 may distribute the assigned portion of bid(s) to participant(s), and/or the like. Similarly, the auction system 140 may provide additional, ancillary functions to the online auction that may not provided by the shared auction provisioning system 130 (e.g., receiving information, item(s), bid(s), payment(s), request(s) for information, and/or the like. However, it is understood that some of the various systems shown in FIG. 5 can be implemented independently, combined, and/or stored in memory of one or more separate computing devices that are included in computer system 100. Further, it is understood that some of the systems and/or functionality may not be implemented, or additional systems and/or functionality may be included as part of computer system 100. Regardless, an embodiment of the invention provides a solution for conducting online auctions.

While shown and described herein as a method and system for conducting an auction, it is understood that the invention further provides various alternative embodiments. For example, in one embodiment, the invention provides a computer program stored on a computer-readable medium, which when executed, enables a computer system to conduct an auction. To this extent, the computer-readable medium includes program code, such as shared auction provisioning system 130 (FIG. 5), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture, on one or more data storage portions of a computing device, as a data signal traveling over a network (e.g., during a wired/wireless electronic distribution of the computer program), on paper (e.g., capable of being scanned and converted to electronic data), and/or the like.

In another embodiment, the invention provides a method of generating a system for conducting an online auction. In this case, a computer system, such as system 102 (FIG. 5), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computer system 100 (FIG. 5), from a computer-readable medium; (2) adding one or more computing devices to the computer system; and (3) incorporating and/or modifying one or more existing devices of the computer system, to enable the computer system 100 to perform the process described herein.

In still another embodiment, the invention provides a business method that performs the process described herein on a subscription, advertising, and/or fee basis. That is, a service provider, such as an Application Integrator, could offer to conduct an online auction as described herein. In this case, the service provider can manage (e.g., create, maintain, support, etc.) a computer system, such as computer system 100 (FIG. 5), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as some or all of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for conducting an auction, the method comprising:
   electronically identifying, on a computer device, an item for auction;
   electronically receiving, on the computer device, a first bid for the item placed at a first time during the auction;
   electronically receiving, on the computer device, a second bid for the item placed at a second time during the auction, wherein the second bid exceeds the first bid by a bid increment and the second time is different than the first time by a time increment;
   declaring a winner of the auction to a participant of the auction that has won the item by making a winning bid, the winning bid being a bid for the item that is highest at an auction close;
   in response to the auction close electronically determining, on the computer device, based on a value of the second bid, an amount for a portion of the second bid for distribution; and
   electronically assigning, on the computer device, the portion of the second bid for distribution to at least one participant of the auction.

2. The method of claim 1, wherein the auction is an online auction.

3. The method of claim 1, further comprising:
   awarding the item to a participant that placed the second bid.

4. The method of claim 1, wherein the second bid is a winning bid.

5. The method of claim 1, wherein the portion is in a range of approximately 1% to approximately 15% of the second bid.

6. The method of claim 1, wherein the at least one participant includes at least one of a participant who placed the first bid and a participant who placed the second bid.

7. The method of claim 1, further comprising distributing the portion of the second bid to the at least one participant.

8. The method of claim 7, wherein the portion of the second bid distributed to a maker of the second bid is related to the bid increment between the first bid and the second bid.

9. The method of claim 7, wherein the portion of the second bid distributed to a maker of the second bid is related to the time increment between the first bid and the second bid.

10. The method of claim 7, further comprising facilitating the distributing using one selected from a group consisting of an electronic payment system, a bank account, and a credit card.

11. The method of claim 1, wherein the portion assigned for distribution is based upon at least one selected from a group consisting of: bid amount, bid frequency, winning bid amount, bid increment, type of bid, quantity of bid, type of bidder, and quantity of bidders.

12. The method of claim 1, further comprising:
    receiving from one of an auction participant and a third party at least one selected from a group consisting of: information, the item, the first bid, the second bid, a payment, and a request for information.

13. A system for conducting an auction, the system comprising:
    a processor; and
    a memory, the memory including:
      a system for identifying an item for auction;
      a system for receiving a first bid for the item placed at a first time during the auction;
      a system for receiving a second bid for the item placed at a second time during the auction, wherein the second bid exceeds the first bid by a bid increment and the second time is different than the first time by a time increment; and
      a system for declaring a winner of the auction to a participant of the auction that has won the item by making a winning bid, the winning bid being a bid for the item that is highest at an auction close;
      a system for assigning, in response to the auction close, a portion of the second bid for distribution to at least one participant of the auction, an amount of the portion of the second bid being determined based on a value of the second bid.

14. The system of claim 13, wherein the auction is an online auction.

15. The system of claim 13, further comprising:
    a system for awarding that awards the item to a participant that placed the second bid.

16. The system of claim 13, wherein the system for receiving the second bid for the item receives the second bid that is a winning bid.

17. The system of claim 13, wherein the system for assigning the portion assigns the portion that is in a range of approximately 1% to approximately 15% of the second bid.

18. The system of claim 13, wherein the at least one participant includes at least one of a participant who placed the first bid and a participant who placed the second bid.

19. The system of claim 13, further comprising a system for distributing that distributes the portion of the second bid to the at least one participant.

20. The system of claim 19, wherein the system for distributing distributes the portion of the second bid to a maker of the second bid based on the bid increment between the first bid and the second bid.

21. The system of claim 19, wherein the system for distributing distributes the portion of the second bid to a maker of the second bid based on the time increment between the first bid and the second bid.

22. The system of claim 19, further comprising a system for facilitating the distributing, wherein the system uses one selected from a group consisting of: an electronic payment system, a bank account, and a credit card.

23. The system of claim 13, wherein the portion assigned for distribution is based upon at least one selected from a group consisting of: bid amount, bid frequency, winning bid amount, bid increment, type of bid, quantity of bid, type of bidder, and quantity of bidders.

24. The system of claim 13, further comprising:
    a system for receiving from one of an auction participant and a third party at least one selected from a group consisting of: information, the item, the first bid, the second bid, a payment, and a request for information.

25. A computer program product stored on a computer-readable storage device, which when executed, enables a computer system to conduct an auction, the computer program comprising program code for enabling the computer system to: identify an item for auction; receive a first bid for the item placed at a first time during the auction; receive a second bid for the item placed at a second time during the auction, wherein the second bid exceeds the first bid by a bid increment and the second time is different than the first time by a time increment; and declare a winner of the auction to a participant of the auction that has won the item by making a winning bid, the winning bid being a bid for the item that is highest at an auction close; in response to the auction close assign a portion of the second bid for distribution to at least one participant of the auction, an amount of the portion of the second bid being determined based on a value of the second bid.

26. The computer program product of claim 25, wherein the at least one participant is one of a participant who placed the first bid and a participant who placed the second bid.

27. A method for deploying an application for conducting an auction, comprising:
- providing a computer infrastructure including a computer device, the computer infrastructure being operable to:
  - identify an item for auction;
  - receive a first bid for the item placed at a first time during the auction;
  - receive a second bid for the item placed at a second time during the auction, wherein the second bid exceeds the first bid by a bid increment and the second time is different than the first time by a time increment;
  - declare a winner of the auction to a participant of the auction that has won the item by making a winning bid, the winning bid being a bid for the item that is highest at an auction close;
  - in response to the auction close determining, based on a value of the second bid, an amount for a portion of the second bid for distribution; and
  - assign a portion of the second bid for distribution to at least one participant of the auction.

* * * * *